(12) United States Patent
Shipley et al.

(10) Patent No.: US 9,908,489 B2
(45) Date of Patent: Mar. 6, 2018

(54) POWER DISTRIBUTION IN AIRCRAFT

(75) Inventors: Adrian Shipley, Cheltenham (GB); Andrew Wyer, Cheltenham (GB)

(73) Assignee: GE AVIATION SYSTEMS LIMITED (GB)

(*) Notice: Subject to any disclaimer, the term of this patent is extended or adjusted under 35 U.S.C. 154(b) by 18 days.

(21) Appl. No.: 13/599,268

(22) Filed: Aug. 30, 2012

(65) Prior Publication Data

US 2013/0229050 A1    Sep. 5, 2013

(30) Foreign Application Priority Data

Aug. 30, 2011   (GB) .................................. 1114890.5

(51) Int. Cl.
| | | |
|---|---|---|
| B60R 16/03 | (2006.01) | |
| H02J 4/00 | (2006.01) | |
| H02M 1/42 | (2007.01) | |
| H02M 3/335 | (2006.01) | |
| H02M 1/00 | (2006.01) | |

(52) U.S. Cl.
CPC ............... B60R 16/03 (2013.01); H02J 4/00 (2013.01); H02M 3/33507 (2013.01); B64D 2221/00 (2013.01); H02M 1/4216 (2013.01); H02M 3/33553 (2013.01); H02M 2001/008 (2013.01); Y02B 70/126 (2013.01)

(58) Field of Classification Search
USPC ............. 307/6, 7, 9.1, 11, 17, 22, 24, 58, 82
See application file for complete search history.

(56) References Cited

U.S. PATENT DOCUMENTS

| | | | |
|---|---|---|---|
| 4,100,596 A | 7/1978 | Olafson et al. | |
| 5,255,174 A | 10/1993 | Murugan | |
| 6,353,544 B1* | 3/2002 | Lau | ............................ 363/21.14 |
| 6,384,491 B1 | 5/2002 | O'Meara | |
| 6,462,976 B1* | 10/2002 | Olejniczak | .............. H01L 23/48 257/E23.01 |
| 7,805,204 B2 | 9/2010 | Ghanekar et al. | |
| 8,174,145 B2 | 5/2012 | Goedecke et al. | |
| 2004/0085784 A1 | 5/2004 | Salama et al. | |

(Continued)

FOREIGN PATENT DOCUMENTS

| | | |
|---|---|---|
| CN | 101071990 A | 11/2007 |
| CN | 101263663 A | 9/2008 |

(Continued)

OTHER PUBLICATIONS

Barrado et al., "Behavioural Modeling of Solid State Power Controllers (SSPC) for Distributed Power Systems," 2009, pp. 1692-1697.*

(Continued)

Primary Examiner — Rexford Barnie
Assistant Examiner — Xuan Ly
(74) Attorney, Agent, or Firm — GE Global Patent Operation; William S. Munnerlyn (57) ABSTRACT

A power distribution system for an aircraft is provided. The power distribution system comprises a first wiring harness connected to a power supply, at least one integrated switching power converter connected to the power supply through the first wiring harness, and at least one electrical load connected to a respective output of a respective integrated switching power converter through a second wiring harness.

21 Claims, 6 Drawing Sheets

(56) References Cited

U.S. PATENT DOCUMENTS

| | | | |
|---|---|---|---|
| 2004/0156154 A1 | | 8/2004 | Lazarovich et al. |
| 2006/0056124 A1 | | 3/2006 | Michalko |
| 2007/0058402 A1 | * | 3/2007 | Shekhawat ............ H02M 1/42 363/89 |
| 2007/0085485 A1 | | 4/2007 | Flickinger et al. |
| 2007/0194625 A1 | * | 8/2007 | Maier ...................... H02J 4/00 307/18 |
| 2007/0195558 A1 | | 8/2007 | Kim et al. |
| 2008/0031021 A1 | * | 2/2008 | Ros et al. ........................ 363/46 |
| 2008/0111420 A1 | | 5/2008 | Anghel et al. |
| 2010/0080031 A1 | * | 4/2010 | Mizukami .......... H02M 7/2176 363/148 |
| 2010/0156171 A1 | | 6/2010 | Sechrist |
| 2010/0172063 A1 | | 7/2010 | Liu et al. |
| 2010/0252691 A1 | | 10/2010 | Malkin et al. |
| 2011/0012607 A1 | | 1/2011 | Kojori et al. |
| 2011/0051463 A1 | * | 3/2011 | Chen ................ H02M 3/33507 363/19 |

FOREIGN PATENT DOCUMENTS

| | | | | |
|---|---|---|---|---|
| EP | 0301386 A2 | | 2/1989 | |
| EP | 0880220 A2 | | 11/1998 | |
| EP | 2063523 A2 | | 5/2009 | |
| EP | 2161829 A2 | | 3/2010 | |
| GB | 2436647 A | | 3/2007 | |
| GB | 2436647 A | * | 10/2007 | ............ H02M 7/068 |
| JP | 2005057871 A | | 3/2005 | |
| WO | 2005038920 A2 | | 4/2005 | |
| WO | 2009125007 A2 | | 10/2009 | |
| WO | 2012069453 A2 | | 5/2012 | |

OTHER PUBLICATIONS

Barrado: "Behavioural Modeling of Solid State Power Controllers (SSPC) for Distributed Power System". APEC 2009. Twenty-Fourth Annual IEEE, Feb. 15-19, 2009, pp. 1692-1697.*

Barrado: "Behavioural Modeling of Solid State Power Controllers (SSPC) for Distributed Power System". APEC 2009. Twenty-Fourth Annual IEEE, Feb. 15-19, pp. 1692-1697.*

Barrado: "Behavioural Modeling of Solid State Power Controllers (SSPC) for Distributed Power System". APEC 2009. Twenty-Fourth Annual IEEE, Feb. 15-19, pp: 1692-1697.*

Izquierdo: "Protection devices for aircraft electrical power distribution systems: a survey", Industrial Electronics, 2008. IECON 2008. 34th Annual Conference of IEEE; Nov. 10-13, 2008 pp. 903-908.

Barrado: "Behavioural Modeling of Solid State Power Controllers (SSPC) for Distributed Power Systems", Applied Power Electronics Conference and Exposition, 2009. APEC 2009. Twenty-Fourth Annual IEEE, Feb. 15-19, 2009, pp. 1692-1697.

Great Britain Search Report dated Jun. 28, 2012 which was issued in connection with the Great Britain Patent Application No. 1114890.5 which was filed on Aug. 30, 2011.

Search Report from GB Application No. 1114890.5, dated Sep. 5, 2012.

Combined search and examination report from corresponding GB Application No. 1403483.9 dated Apr. 14, 2014.

Office Action issued in connection with corresponding GB Application No. GB1403483.9 dated Oct. 23, 2014.

GB Office Action dated May 1, 2015 in relation to corresponding GB application 1403483.9.

Friedman, "Solid-State Power Controllers for the Next Generation", Proceedings of the National Aerospace and Electronics Conference (NAECON), Dayton, Volume No. 1, pp. 155-162, May 18-22, 1992.

French Search Report and Written Opinion issued in connection with corresponding FR Application No. 1262434 dated Oct. 6, 2015.

Unofficial translation of CN office action dated Jul. 28, 2015 in relation to corresponding CN application 201210314077.7.

Unofficial translation of JP Office Action dated Nov. 15, 2016 in connection with corresponding JP Application 2012-186137.

Unofficial translation of JP Office Action dated May 24, 2016 in connection with corresponding JP Application 2012-186137.

* cited by examiner

POWER DISTRIBUTION IN AIRCRAFT

BACKGROUND OF THE INVENTION

Embodiments of the present invention relate generally to power distribution in aircraft. More particularly, embodiments of the present invention relate to systems and devices for providing improved electrical power distribution in aircraft.

Conventional electrical power distribution systems for aircraft may provide a transformer-rectifier unit (TRU) for converting a relatively high voltage AC input derived from an on-board generator, such as an aircraft auxiliary power unit (APU), into a DC output. Such a TRU may be located proximal to the APU with a low voltage high current bus then being used to distribute power to various loads about the aircraft fuselage. Additionally, various conventional wire harness protection devices, such as one or more solid state power controllers (SSPCs), may be provided to control the power supplied to various loads by preventing over voltage conditions, providing arc protection, lightning protection, etc.

For example, a three-phase 230 volt input may be converted to a 28 volt DC output by a TRU for distribution using low voltage cabling provided to distribute the 28 volt DC about the aircraft. Such low voltage cabling, however, needs to be able to carry a high current (e.g. 700 amperes) without overheating. This means that the cabling required necessarily has a large conductor core and is thus heavy. Moreover, since the TRU is generally located proximal to the generator, many kilometers of cabling may thus be necessary to distribute the low voltage power throughout the whole aircraft. This thus necessarily means that the aircraft wiring harness is heavy.

BRIEF DESCRIPTION OF THE INVENTION

Embodiments of the present invention have therefore been devised whilst bearing the above-mentioned drawbacks associated with known aircraft power distribution systems in mind. According to an embodiment of the present invention, there is thus provided a power distribution system for an aircraft. The power distribution system comprises a first wiring harness connected to a power supply. At least one integrated switching power converter is connected to the power supply through the first wiring harness. Additionally, at least one electrical load is connected to a respective output of a respective integrated switching power converter through a second wiring harness.

According to another embodiment of the present invention, there is provided an integrated switching power converter (ISPC) for use in an aircraft. The integrated switching power converter comprises voltage converting circuitry for converting an input voltage at a first level to an output voltage at a second level and output connectors for connecting the output voltage to one or more loads. Also included in the ISPC is solid state power controller circuitry for regulating the output voltage and/or current supplied by the output connectors to the one or more loads.

By providing an integrated switching power converter and new architecture that can use this novel device, various embodiments of the present invention can be provided in which lighter wiring harnesses may be used for aircraft.

Moreover, a simplified power distribution architecture may also be provided, thereby reducing the time and cost of both installation and repair work needed when providing or maintaining an aircraft electrical power supply system.

BRIEF DESCRIPTION OF THE DRAWINGS

Various aspects and embodiments of the present invention will now be described in connection with the accompanying drawings, in which.

DETAILED DESCRIPTION OF EXEMPLARY EMBODIMENTS OF THE INVENTION

Figure 1:
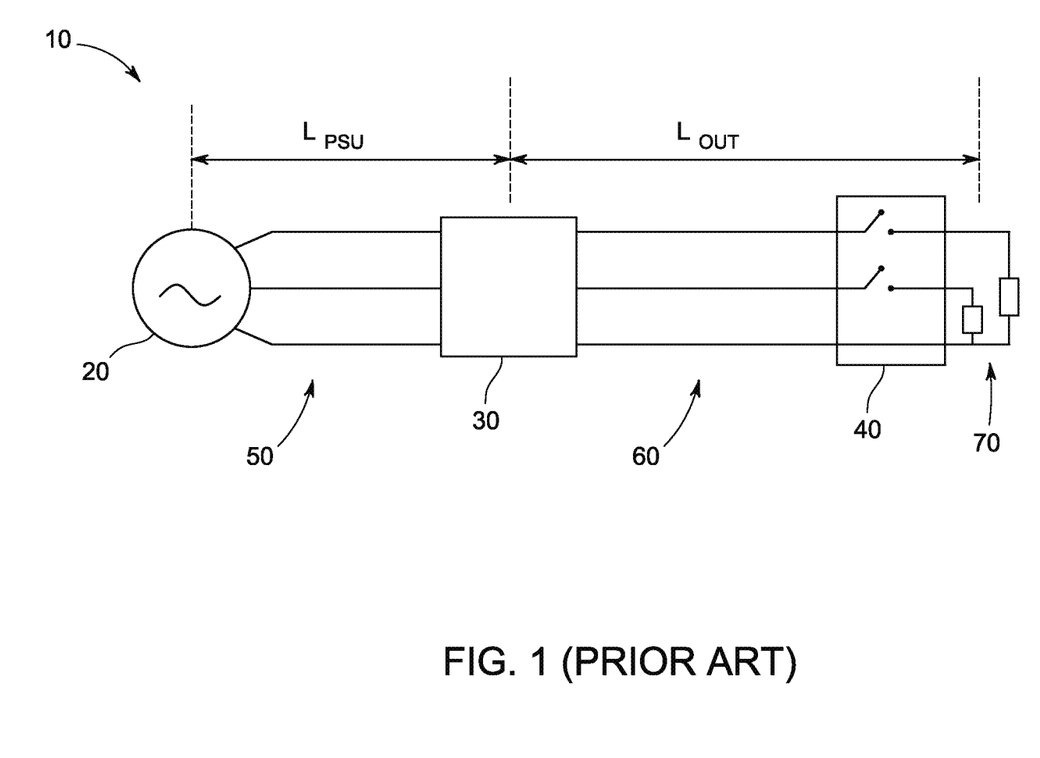
FIG. 1 shows a conventional power distribution system for an aircraft.

FIG. 1 shows a conventional power distribution system 10 for an aircraft. The power distribution system 10 includes a three-phase high voltage (e.g. 230V AC) generator 20. The generator 20 is connected to a transformer-rectifier unit (TRU) 30 located proximal thereto by a first power bus 50. The power bus 50 has a length $L_{PSU}$ and comprises three separate conducting wires bundled together.

The TRU 30 may be configured to provide various output voltages for distribution about an aircraft. For example, cabin power at 28V DC may be needed by loads 70. Thus a second power bus 60 is used to distribute the cabin power from the TRU 30 to the loads 70 via a solid state power controller 40 which provides protection to the wiring and loads. In the example shown, the SSPC 40 controls the power provided to two loads, although those skilled in the art will be aware that more or fewer such loads may be controlled by a single SSPC 40, and that one or more such SSPCs 40 may be connected to the second power bus 60 as required. Additional power busses (not shown) may also be provided to distribute power at other voltages about the aircraft.

The loads 70, e.g. provided in the cabin, may be distributed some distance from the TRU 30 which may be co-located with the generator 20 near one of the aircraft engines, for example. Hence the length of wiring $L_{OUT}$ provided in the second power bus 60 may be considerable, such that $L_{OUT} \gg L_{PSU}$ for example.

However, given that the second power bus 60 operates at a relatively low supply voltage (such as 28V), the wiring therein has to be such that relatively high currents can be carried (e.g. 700 A for a 19.6 kW supply).

This thus implies that long, large core diameter cabling is needed for the second power bus 60, which in turn means that the second power bus 60 is necessarily inherently relatively heavy. The weight of any armouring provided to protect the second power bus 60 also increases as the diameter of the bus increases and therefore adds further to the weight of any wiring harness incorporating the second power bus 60.

Figure 2:
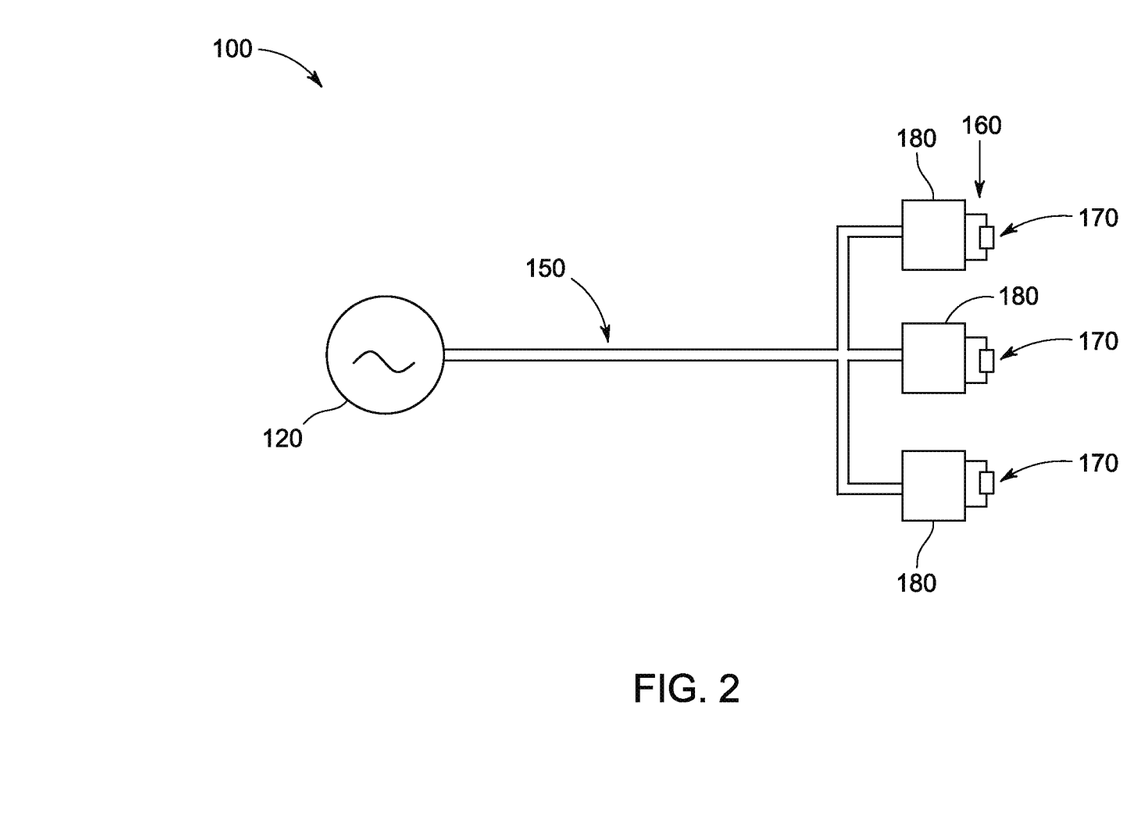
FIG. 2 shows a power distribution system for an aircraft in accordance with various embodiments of the present invention.

FIG. 2 shows a power distribution system 100 for an aircraft in accordance with various embodiments of the present invention. The power distribution system 100 comprises a first wiring harness 150 connected to a power supply 120. The first wiring harness 150 may, for example, be used to distribute high voltage AC or DC power from the power supply 120. In one embodiment, the wiring harness 150 comprises a pair of thin wires for distributing high tension (HT) AC or DC power, e.g. at 270V DC. Using such wires not only provides a relatively light cable but also provides common mode voltage protection for any devices connected thereto. This is particularly useful when the first wiring harness 150 is distributed over substantially the whole airframe as it then gives good protection to devices in the aircraft from electromagnetic interference (EMI) caused by thunder storms, lightning strikes, etc.

In alternate embodiments, three or four relatively thin wires may be used to distribute HT AC power from the power supply 120. The HT cabling is relatively light as the core diameters of the conductors therein are small. For example, the first wiring harness 150 may include HT cabling rated for DC or AC operation at: >100V, >200V, >250V, about 230V, 270V, −270V, ±270V, 540V, etc. Use of thin wiring is not only weight-saving, but also makes the necessary cabling relatively flexible and thus easier to duct about an airframe.

The power distribution system 100 also includes at least one integrated switching power converter 180 connected to the power supply 120 through the first wiring harness 150. Switching converters are preferred since they provide higher efficiency compared to linear regulators. For example, integrated switching power converters of the embodiments described below with reference to FIGS. 3 to 6 may be used. Such integrated switching power converters 180 can be distributed around an aircraft fuselage close to the respective load (or loads) 170 that they are to drive. A relatively short higher current capacity second wiring harness 160 can thus be used to connect the electrical load(s) 170 to a respective output of an associated integrated switching power converter 180. In this manner, the electrical load(s) 170 may be located proximal to the integrated switching power converter(s) 180 that drive and protect them.

In various embodiments, the average length $L_{OUT\_AV}$ of connector wires of the second wiring harness 160 connecting the integrated switching power converters 180 to respective electrical loads 170 is shorter than the average length $L_{PSU\_AV}$ of the wires connecting the power supply 120 to the integrated switching power converter(s) 180, such that $L_{PSU\_AV} > L_{OUT\_AV}$. In various embodiments the load(s) may be located proximal a respective integrated switching power converter such that: $L_{OUT\_AV} \ll L_{PSU\_AV}$, $L_{OUT\_AV} < L_{PSU\_AV}/2$, $L_{OUT\_AV} < L_{PSU\_AV}/5$, $L_{OUT\_AV} < L_{PSU\_AV}/10$, or $L_{OUT\_AV} < L_{PSU\_AV}/100$, with the respective total wiring harness weight decreasing the shorter the second wiring harness 160 is compared to the first wiring harness 150.

Various conductor arrangements may be provided in the first and/or second wiring harnesses 150, 160. For example, wires or electrical equivalents thereof may be provided by a bus, etc. For example, a solid form bus bar that is powder coated may be provided. Single strand, multi-strand, copper, aluminium, etc. electrical conductors may also be used to provide the required conductive structures for power coupling as would be apparent to those skilled in the art.

Whereas the first wiring harness may be configured to distribute HT electrical power about an aircraft fuselage, the second wiring harness 160 may include cabling for DC. Such DC cabling may be rated for low voltage operation (e.g. at <30V) and thus be relatively heavy per unit length when compared to the HT cabling. In various embodiments, the DC cabling may be configured to provide electrical power at a rating of >5 kW, >10 kW, about 20 kW, or >20 kW. For example, 19.6 kW power may be supplied at 28V for use in the aircraft cabin.

In various embodiments, the integrated switching power converter(s) include at least one DC-DC power converter. The integrated switching power converter(s) may also be configured together to provide a distributed functional equivalent of a transformer rectifier unit (TRU). Such integrated switching power converter(s) can be flexibly tailored for specific purposes, and so that new loads may be added to existing systems without having to rewire or replace the whole primary power distribution harness should, for example, there be a desire or need to add one or more loads that require a power supply voltage not been previously available on the aircraft.

Certain power distribution systems provided in accordance with various embodiments of the present invention are thus much easier to reconfigure, modify, or adjust than conventional aircraft power distribution systems.

Figure 3:
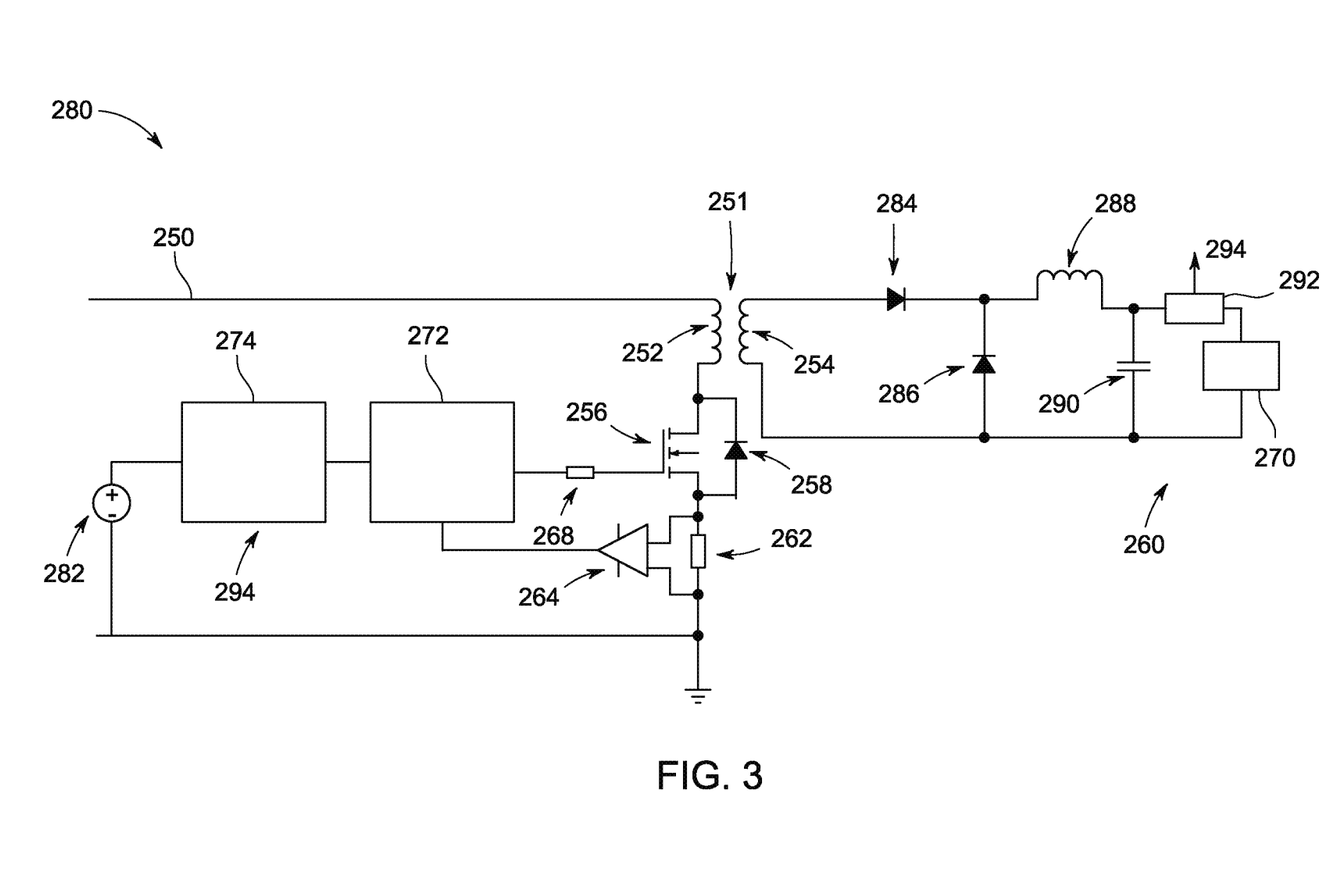
FIG. 3 shows an integrated switching power converter in accordance with an embodiment of the present invention.

FIG. 3 shows an integrated switching power converter 280 in accordance with an embodiment of the present invention. The integrated switching power converter 280 comprises a combined power conversion stage and an SSPC stage. The SSPC stage may be used to provide a cable protection function without proving any regulation.

The integrated switching power converter 280 has a power input line 250 connected to a transformer 251. Power fed into the power input line 250 is converted by voltage converting circuitry into DC power to drive a load 270. Primary coil 252 of the transformer 251 is connected to solid state power controller circuitry for providing power regulation and protection to the integrated switching power converter 280.

The power input line 250 is connected to one side of the primary coil 252. The other side of the primary coil 252 is connected to the drain of a power MOSFET 256. The source connection of the MOSFET 256 is connected to ground through a current sense resistor 262. A reverse biased diode 258 is provided across the source and drain connections of the MOSFET 256 to prevent back-induced EMF damage to the MOSFET 256. The substrate connection of the MOSFET 256 is connected to the source potential, whilst the gate connection is coupled to a conversion controller 272 through a resistor 268.

Inputs to an operational amplifier 264 are connected across the current sense resistor 262. The operational amplifier 264 is configured to provide a predetermined fixed gain. The output of the operational amplifier 264 then provides a current sensing signal that is fed to the conversion controller 272. The conversion controller 272 is coupled to an SSPC 274. SSPC 274 is powered by a DC supply 282 and controls the conversion controller 272 such that the conversion controller 272 then regulates the current in the primary coil 252 by modifying the voltage applied to the gate of the power MOSFET 256 through the resistor 268. Any failure of the MOSFET 256 in either an open or closed state will prevent the load 270 from being provided with power. The current sense for the SSPC 274 is taken from an output 294 of a current sense circuit 292 used for measuring the input current to load 270. The output current is thus measured by the SSPC 274 and a decision can be made thereby to disable the switching converter. The current sense circuit 292 may, for example, be provided by a similar current sense resistor/op-amp arrangement as is used to provide the current sensing signal for the conversion controller 272. This design may thus be used in various guises to provide an inherently fail-safe power distribution system.

A first end of a secondary coil 254 of the transformer 251 is connected in series with a first rectifier diode 284 and choke 288 to the load 270. The first end of secondary coil 254 is connected to the anode of the first rectifier diode 284. A second end of the secondary coil 254 is connected to the load and to the anode of a second rectifier diode 286. The cathodes of the first and second rectifier diodes 284, 286 are connected together and to one end of the choke 288. The other end of choke 288 is connected to the load 270 through current sense circuit 292. Output connectors 260 couple the terminals of a smoothing capacitor 290 in parallel across the load 270 and current sense circuit 292. The lead of the smoothing capacitor 290 not electrically connected to the choke 288 is connected to both the load 270 and the anode of the second rectifier diode 286.

In operation, the first and second rectifier diodes 284, 286, choke 288 and smoothing capacitor 290 act to rectify and smooth AC power provided by the secondary coil 254. A DC supply is thus provided to the load 270 from the output connectors 260.

Figure 4:
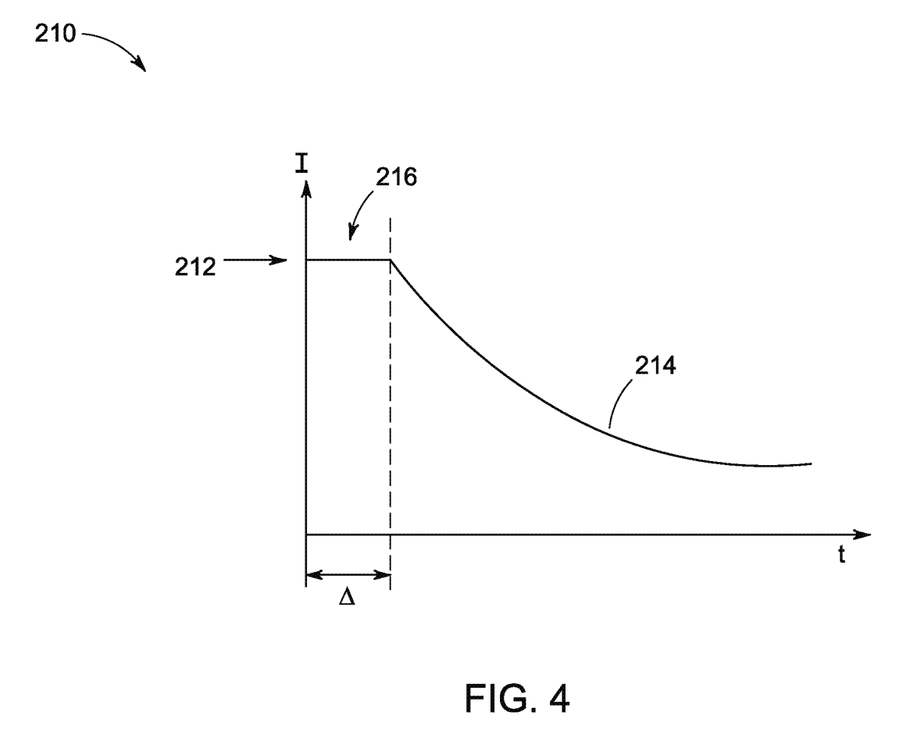
FIG. 4 shows an $I_2 t$ distribution protection curve for the integrated switching power converter of FIG. 3.

FIG. 4 shows an $I^2t$ distribution protection curve 210 for the integrated switching power converter 280 of FIG. 3. The $I^2t$ distribution protection curve 210 illustrates how the current output from the output connectors 260 to the load 270 is temporally limited in order to protect the load 270 and the wiring harness connecting the integrated switching power converter 280 thereto.

A short duration area 216 in which current is limited to a maximum level 212 (e.g. 600% of rated maximum constant current) for a time Δ is shown. The short duration area 216 is managed by the conversion controller 272, on a cycle by cycle basis. This in turn is monitored by the SSPC 274, which also controls an $I^2t$ functional area 214. SSPC 274 is provided with the same current sense signal as conversion controller 272, but has overall authority to inhibit the power conversion stage. This combination may thus provide an overall integrated power conversion function of load protection and distributed switching control.

Figure 5:
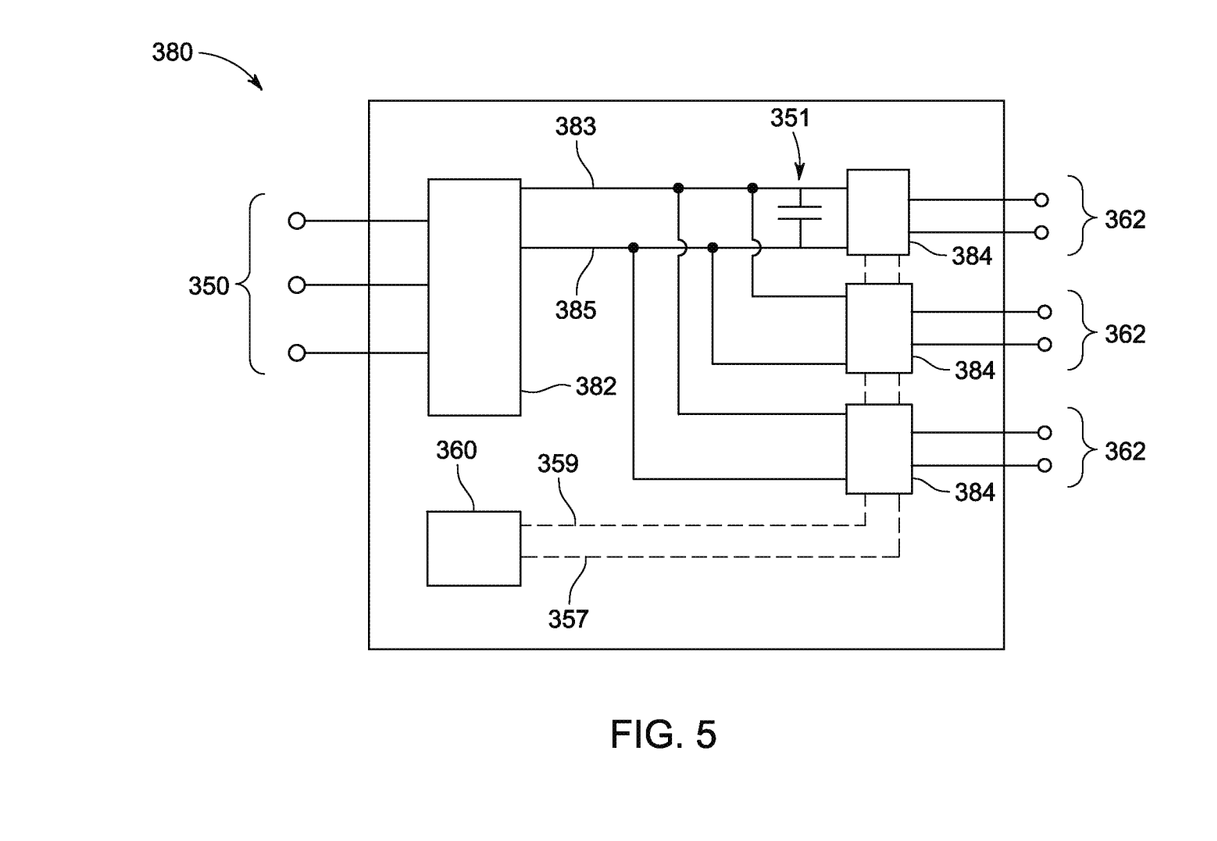
FIG. 5 shows an integrated switching power converter in accordance with another embodiment of the present invention.

FIG. 5 shows an integrated switching power converter 380 in accordance with another embodiment of the present invention. The integrated switching power converter 380 includes a set of three input power lines 350. The input power lines 350 provide three phase power to a power corrector 382. The cabling connected to the input power lines 350 may connect to high voltage low current wiring of a first wiring harness (not shown), and provides input power to the integrated switching power converter 380. The power corrector 382 provides power factor correction that makes the electrical system appear like a resistor to any upstream source. Such power factor correction is often mandated for most aerospace applications, and may provide an output using a high voltage DC link bus operating at a higher potential than the input can generate.

The power corrector 382 produces a DC output potential between a first DC power line 383 and a second DC power line 385. Three DC-DC converters 384 are provided in parallel with one another. Also connected between the first and second DC power lines 383, 385 is a smoothing capacitor 351. A DC input is thus provided to each of the DC-DC converters 384.

The DC-DC converters 384 are controlled by a control unit 360 through first and second control lines 357, 359. Each respective DC-DC converter 384 is also provided with a pair of output connectors 362 for connecting to a second wiring harness (not shown). One advantage of using DC-DC converters 384 is to provide redundancy with localised shorting protection. The use of DC to DC conversion additionally provides the advantage that, if the control unit 360 fails, the integrated switching power converter 380 will stop working as no power is transferred across the transformer 386 from the supply to the loads thereby providing an inherently safe failure mode for this design.

In operation, the control unit 360 provides switching control signals to respective of the DC-DC converters 384 to regulate the output voltage and limit the current provided by the output connectors 362. The switching control signals may, for example, provide pulse width modulation (PWM) control to the DC-DC converters 384. As is known in the art, PWM may be used to provide two control states for the switching device, i.e. a voltage drop with no/low current or current with no/low drop voltage. Hence a low power loss occurs in the switch itself compared, for example, to a linear drive scheme in which resistive losses in the MOSFET itself would be high. Fixed or variable duty cycle switching may also be used.

The control unit 360 also includes a microprocessor unit (not shown). The microprocessor unit can be used to add algorithmic processing to the integrated switching power converter 380 such that SSPC functionality is provided. By integrating a switching converter with an SSPC function, various embodiments of the present invention are able to dispense with conventional SSPC high output power MOSFETs that are normally required for a high current output and instead provide a local SSPC function that can disable a lower power switch, e.g. such as a MOSFET, used to provide switching functionality in the converter. Optionally, various current sensors (not shown) may also be provided in the integrated switching power converter 380 which can then be monitored by the control unit 360.

Figure 6:
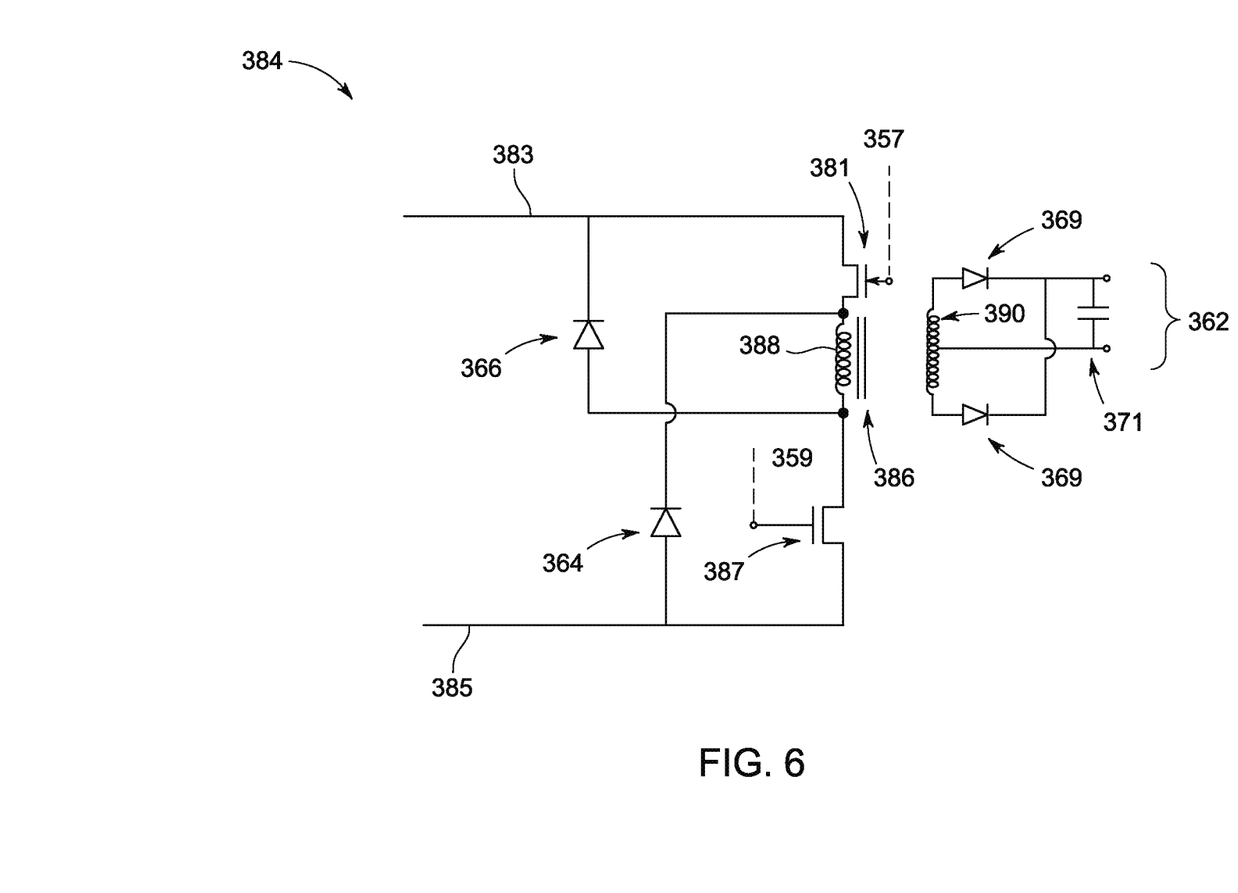
FIG. 6 shows a DC-DC converter for use in the integrated switching power converter of FIG. 5.

FIG. 6 shows a DC-DC converter 384 for use in the integrated switching power converter 380 of FIG. 5. The first DC power line 383 is connected to a drain connection of a first FET switch 381. A gate connection of the first FET switch 381 is connected to the first control line 357. The second DC power line 385 is connected to a source connection of a second FET switch 387. A gate connection of the second FET switch 387 is connected to the second control line 359. One or more of the first and second FET switches 381, 387 may be provided using silicon carbide (SiC) field effect transistors. Such SiC FETs are particularly useful where HT supplies are provided.

A transformer 386 is also provided in the DC-DC converter 384. Primary coil 388 of the transformer 386 connects the source of the FET switch 381 to the drain of the second FET switch 387. The FET switches 381, 387 are protected from back-EMF by a first diode 364 and a second diode 366. The anode of the first diode 364 is connected to the second DC power line 385 and the cathode of the first diode 364 to the source of the first FET switch 381. The cathode of the second diode 366 is connected to the first DC power line 383 and the anode of the second diode 366 to the drain of the second FET switch 387.

The secondary coil 390 of the transformer 386 is center-tapped. The center tap provides a first output connector 362. A second output connector 362 is connected to the cathode of a first rectifier diode 369. The anode of the first rectifier diode 369 is connected to one end of the secondary coil 390. The second end of the secondary coil 390 is connected to the anode of a second rectifier diode 368. The cathode of second rectifier diode 368 is also connected to the second output connector 362. A capacitor 371 is additionally provided between the first and second output connectors 362 for DC ripple reduction.

Any failure of one or more of the FET switches 381, 387 (in either open or short circuit mode) will prevent any power from being transferred across the transformer 386, thereby providing additional further inherent protection to the integrated switching power converter 380 from such component failure.

Whilst various aspects and embodiments of the present invention have been described herein, certain variations will be apparent to those skilled in the art. For example, those skilled in the art will realize that the use of various integrated switching power converters may permit a first wiring harness to operate only using a single supply voltage thereby enabling the replacement of multiple voltage buses found in conventional aircraft power distribution systems. For example, a first wiring harness may use a 230V AC or +/−270V DC supply with local power conversion then being employed by various integrated switching power converters to create the specific voltages required for any particular load locally. Such configurations may thus be used to further reduce the complexity of wiring, volume of components used, and the overall weight for various aircraft power distribution systems. For example, it is envisaged that various embodiments of the present invention may provide a 30% weight reduction in overall wiring harness weight.

Additionally, those skilled in the art will be aware that various low-voltage power bus arrangements may use a single power bus with a return or ground line being provided by various conductive components of an aircraft fuselage. Various integrated switching power converters according to embodiments of the present invention may also be provided as single packaged components, for example with the circuitry thereof being formed as a single integrated circuit (IC) on a common semiconductor wafer.

It will also be understood by those skilled in the art that integrated switching power converters may be provided to add upgrade capability to a conventional power supply system. Such integrated switching power converters may without limitation, either individually or in combination, be used to power one or more loads at one or more voltages.

What is claimed is:

1. A power distribution system for an aircraft, the power distribution system comprising:
   a first wiring harness connected to a power supply;
   at least one integrated switching power converter connected to the power supply through the first wiring harness, the at least one integrated switching power converter comprising a power corrector for providing power factor correction for the power supply;
   at least one electrical load connected to an output of a respective integrated switching power converter through a second wiring harness; and
   a conversion controller that limits a first current through the at least one electrical load, based at least in part on a first current sensing signal indicative of the first current and on a predetermined distribution protection schema, by controlling a second current through a primary coil of the at least one integrated switching power converter based at least in part on a second current sensing signal indicative of the second current.

2. The power distribution system of claim 1, wherein a respective electrical load is located proximal the respective integrated switching power converter that powers the electrical load.

3. The power distribution system of claim 1, wherein the length of output connector wires of the second wiring harness connecting an integrated switching power converter to its respective electrical load is shorter than the length of the connector wires connecting the power supply to the respective integrated switching power converter.

4. The power distribution system of claim 3, wherein $L_{PSU} > L_{OUT}$ such that:

$$L_{OUT} < L_{PSU}/2, L_{OUT} < L_{PSU}/5, L_{OUT} < L_{PSU}/10, \text{ or } L_{OUT} < L_{PSU}/100,$$

wherein $L_{OUT}$ is the length of output connector wires of the second wiring harness connecting an integrated switching power converter to its respective electrical load, and $L_{PSU}$ is the length of the connector wires connecting the power supply to the respective integrated switching power converter.

5. The power distribution system of claim 1, wherein the second wiring harness includes cabling for DC.

6. The power distribution system of claim 5, wherein the cabling for DC is rated for low voltage operation and a power of >5 kW, >10 kW, about 20 kW, or >20 kW.

7. The power distribution system of claim 6, wherein the low voltage is less than 30V.

8. The power distribution system of claim 1, wherein the first wiring harness includes HT cabling rated for DC or AC operation at: >100V, >200V, >250V, about 230V, 270V, or 540V.

9. The power distribution system of claim 1, wherein the first wiring harness includes high voltage DC cable having twin conductors.

10. The power distribution system of claim 1, wherein the at least one integrated switching power converter includes at least one DC-DC power converter.

11. The power distribution system of claim 1, further comprising a plurality of integrated switching power converters configured together to provide a distributed functional equivalent of a transformer rectifier unit.

12. An integrated switching power converter for use in an aircraft, the integrated switching power converter comprising:
   voltage converting circuitry for converting an input voltage at a first level to an output voltage at a second level;
   output connectors for connecting the output voltage to one or more loads;
   power correction circuitry for providing power factor correction for the power supply; and
   solid state power controller circuitry for regulating the output voltage and a first current supplied by the output connectors to the one or more loads based at least in part on a first current sensing signal indicative of the first current and according to a predetermined distribution protection policy by controlling a second current through a primary coil of the integrated switching power converter based at least in part on a second current sensing signal indicative of the second current, wherein controlling the second current in the primary coil includes modifying a voltage applied to a power transistor communicatively coupled to the primary coil.

13. The integrated switching power converter of claim 12, wherein the converter is provided in a single component package.

14. The integrated switching power converter of claim 12, wherein the voltage converting circuitry and solid state power controller circuitry are at least one of formed together as an integrated circuit, or comprise one or more silicon carbide field effect transistors.

15. The integrated switching power converter of claim 12, wherein the predetermined distribution protection policy includes a predetermined $I^2t$ distribution protection curve.

16. The integrated switching power converter of claim 12, wherein the voltage converting circuitry comprises one or more switching converters.

17. The integrated switching power converter of claim 16, wherein the one or more switching converters include at least one DC-DC converter.

18. The integrated switching power converter of claim 16, wherein the solid state power controller circuitry comprises a control unit operable to control the one or more switching converters provided by the voltage converting circuitry.

19. The integrated switching power converter of claim 18, wherein the control unit is operable to implement algorithmic processing in the integrated switching power converter to provide solid state power controller (SSPC) functionality.

20. The integrated switching power converter of claim 18, wherein the control unit is operable to implement a pulse-width modulation (PWM) scheme to provide a variable switching duty cycle to control the output of the one or more switching converters.

21. The integrated switching power converter of claim 12, wherein failure of the power transistor in either an open or closed state will prevent the one or more loads from being supplied with power.

* * * * *